US009097800B1

(12) United States Patent
Zhu

(10) Patent No.: US 9,097,800 B1
(45) Date of Patent: Aug. 4, 2015

(54) SOLID OBJECT DETECTION SYSTEM USING LASER AND RADAR SENSOR FUSION

(71) Applicant: Google Inc., Mountain View, CA (US)

(72) Inventor: Jiajun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 13/649,384

(22) Filed: Oct. 11, 2012

(51) Int. Cl.
*G01S 13/86* (2006.01)
*G01S 13/42* (2006.01)
*G01S 13/93* (2006.01)

(52) U.S. Cl.
CPC ............ *G01S 13/865* (2013.01); *G01S 13/426* (2013.01); *G01S 2013/935* (2013.01); *G01S 2013/9342* (2013.01); *G01S 2013/9346* (2013.01)

(58) Field of Classification Search
CPC ..... G01S 13/04; G01S 13/865; G01S 13/426; G01S 13/726; G01S 13/9342; G01S 13/9346; G01S 13/935; G01S 2013/9342; G01S 2013/9346; G01S 2013/935
USPC .................................... 701/23, 24, 26, 27, 28
See application file for complete search history.

(56) References Cited

U.S. PATENT DOCUMENTS

| | | | | |
|---|---|---|---|---|
| 3,787,842 | A * | 1/1974 | Thomas | 342/160 |
| 4,926,174 | A | 5/1990 | Fiori, Jr. | |
| 5,241,481 | A | 8/1993 | Olsen | |
| 6,741,363 | B1 | 5/2004 | Kaupert | |
| 7,197,388 | B2 * | 3/2007 | Xu et al. | 701/38 |
| 7,369,229 | B2 | 5/2008 | Bissett, III et al. | |
| 7,502,688 | B2 | 3/2009 | Kirokawa | |
| 7,917,320 | B2 | 3/2011 | Levesque et al. | |
| 8,060,271 | B2 | 11/2011 | Dolgov et al. | |
| 8,111,924 | B2 | 2/2012 | Kelle et al. | |
| 8,126,642 | B2 | 2/2012 | Trepagnier et al. | |
| 8,170,787 | B2 | 5/2012 | Coats et al. | |
| 8,818,609 | B1 * | 8/2014 | Boyko et al. | 701/28 |
| 2005/0285774 | A1 * | 12/2005 | Wittenberg et al. | 342/70 |
| 2006/0125680 | A1 * | 6/2006 | Thackray | 342/54 |
| 2007/0040121 | A1 | 2/2007 | Kalayeh | |
| 2008/0035789 | A1 | 2/2008 | Lewis et al. | |
| 2008/0059015 | A1 * | 3/2008 | Whittaker et al. | 701/23 |

(Continued)

OTHER PUBLICATIONS

D. Pirozzo et al., "Spectrally Queued Feature Selection for Robotic Visual Odometery", Nov. 23, 2010.

(Continued)

*Primary Examiner* — Tuan C. To
*Assistant Examiner* — Dale W Hilgendorf
(74) *Attorney, Agent, or Firm* — McDonnell Boehnen Hulbert & Berghoff LLP

(57) ABSTRACT

A light detection and ranging device associated with an autonomous vehicle scans through a scanning zone while emitting light pulses and receives reflected signals corresponding to the light pulses. The reflected signals indicate a three-dimensional point map of the distribution of reflective points in the scanning zone. A radio detection and ranging device scans a region of the scanning zone corresponding to a reflective feature indicated by the three-dimensional point map. Solid objects are distinguished from non-solid reflective features on the basis of a reflected radio signal that corresponds to the reflective feature. Positions of features indicated by the reflected radio signals are projected to estimated positions during the scan with the light detection and ranging device according to relative motion of the radio-reflective features indicated by a frequency shift in the reflected radio signals.

18 Claims, 11 Drawing Sheets

(56) References Cited

U.S. PATENT DOCUMENTS

| | | | |
|---|---|---|---|
| 2008/0162027 | A1 | 7/2008 | Murphy et al. |
| 2009/0237269 | A1* | 9/2009 | Okugi et al. ............ 340/901 |
| 2010/0039318 | A1 | 2/2010 | Kmiecik |
| 2010/0063663 | A1* | 3/2010 | Tolstedt et al. ........... 701/23 |
| 2010/0063664 | A1* | 3/2010 | Anderson .................. 701/23 |
| 2010/0066587 | A1* | 3/2010 | Yamauchi et al. ......... 342/54 |
| 2010/0104199 | A1* | 4/2010 | Zhang et al. ............ 382/199 |
| 2010/0118116 | A1 | 5/2010 | Tomasz |
| 2010/0150431 | A1 | 6/2010 | Chen et al. |
| 2010/0198488 | A1 | 8/2010 | Groitzsch et al. |
| 2010/0283637 | A1 | 11/2010 | Franko et al. |
| 2011/0040482 | A1 | 2/2011 | Brimble et al. |
| 2011/0274343 | A1 | 11/2011 | Krishnaswamy |
| 2012/0008129 | A1 | 1/2012 | Lu et al. |
| 2012/0044476 | A1 | 2/2012 | Earhart et al. |
| 2012/0176499 | A1* | 7/2012 | Winter et al. ............ 348/148 |
| 2013/0038681 | A1* | 2/2013 | Osipov et al. ............. 348/36 |
| 2014/0032012 | A1* | 1/2014 | Joshi et al. ................ 701/1 |

OTHER PUBLICATIONS

A. Brook et al., "Fusion of Hyperspectral Images and Lidar Data for Civil Engineering Structure Monitoring".

Middleton Research, Hyperspectral Imaging, Hyperspectral Imaging Catalog, retrieved Aug. 2012, pp. 2-4, Middleton, WI.

Middleton Research, Stages and Scanners, Stages and Scanners Catalog, retrieved Aug. 2012, pp. 72-76, Middleton, WI. Considered by web search, no copy included with submission.

Master's Thesis, "Collocating satellite-based radar and radiometer measurements to develop an ice water path retrieval", Gerrit Holl, Jun. 9, 2009.

Ho et al., "Demonstration of Literal Three-Dimensional Imaging", 1998.

Middleton Research, Stages and Scanners, Stages and Scanners Catalog, retrieved Aug. 2012, pp. 72-76, Middleton, WI.

* cited by examiner

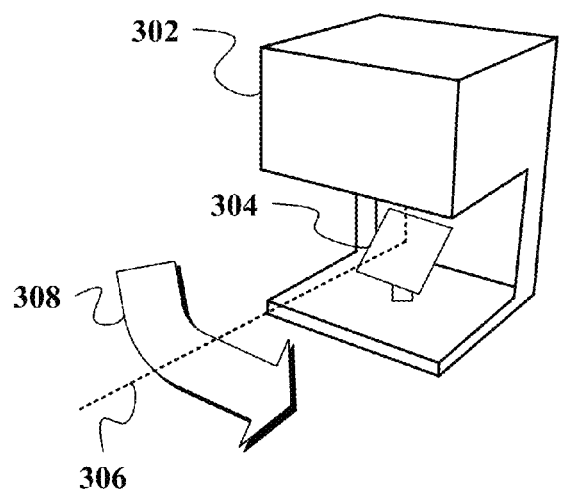
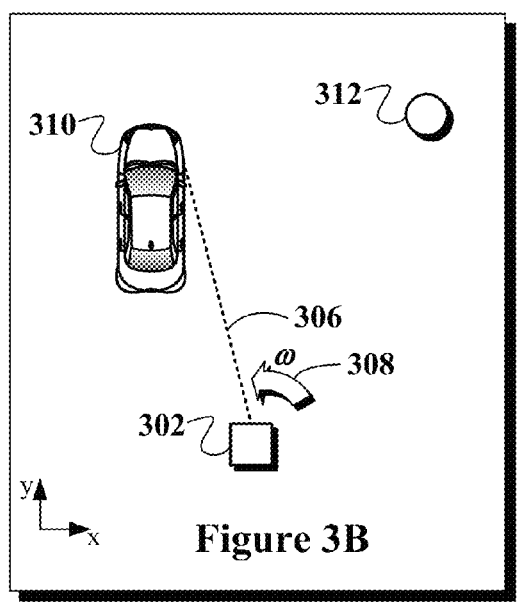 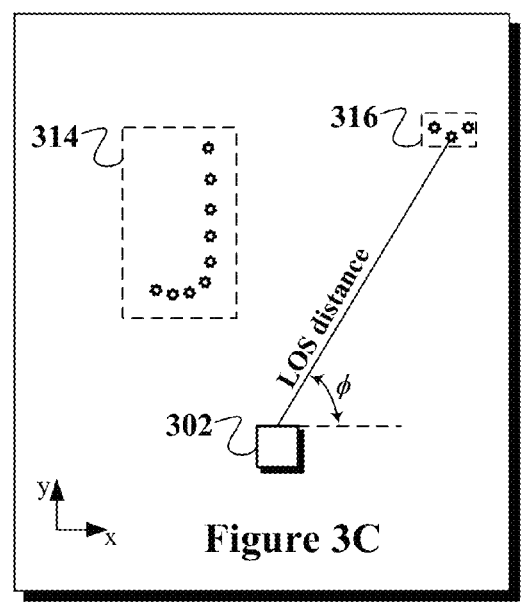
Figure 3A
Figure 3B
Figure 3C

SOLID OBJECT DETECTION SYSTEM USING LASER AND RADAR SENSOR FUSION

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

Another sensor is a radio detection and ranging (RADAR) device. A RADAR actively estimates distances to environmental features while scanning through a scene to assemble a cloud of point positions indicative of the three-dimensional shape of the environmental scene. Individual points are measured by emitting a radio frequency radiation from a directional antenna and detecting a returning signal, if any, reflected from an environmental object, and determining the distance to the object according to the time delay between the emitted pulse and the reception of the reflected pulse. The scene can be illuminated by radio frequency radiation by repeatedly sweeping the directional antenna across the scene to provide continuous real-time information on distances to objects in the scene reflecting radio frequency radiation.

SUMMARY

An environmental sensor system for an autonomous vehicle is disclosed that combines information from a LIDAR device and a RADAR device to determine whether features indicated by the LIDAR device include solid materials. The ability to distinguish solid materials from fluid materials allows the autonomous vehicle to inform navigation decisions on the basis of the environmental surroundings determined to include solid materials while safely ignoring fluid materials that do not present navigational obstacles, such as exhaust plumes, water vapor, etc.

Some embodiments of the present disclosure provide a method including scanning a light detection and ranging (LIDAR) device associated with an autonomous vehicle through a scanning zone while emitting light pulses. The method can include scanning a light detection and ranging (LIDAR) device associated with an autonomous vehicle through a scanning zone while emitting light pulses. The method can include determining a three-dimensional (3-D) point map of the scanning zone based on time delays between emitting the light pulses and receiving corresponding returning reflected signals and based on orientations of the LIDAR device while emitting the light pulses. The method can include scanning, with a radio detection and ranging (RADAR) device associated with the autonomous vehicle, one or more regions of the scanning zone corresponding to one or more light-reflective features indicated by the 3-D point map. The method can include determining whether the one or more light-reflective features include a solid material. The method can include, for each of the one or more light-reflective features, determining that the light-reflective feature includes a solid material responsive to detecting a reflected radio signal corresponding to the light-reflective feature. The method can include, for each of the one or more light-reflective features, determining that the light-reflective feature does not include a solid material responsive to not detecting a reflected radio signal corresponding to the light-reflective feature. The method can include controlling the autonomous vehicle to avoid light-reflective features determined to include a solid material.

Some embodiments of the present disclosure provide an autonomous vehicle system. The autonomous vehicle system can include a light detection and ranging (LIDAR) device, a radio detection and ranging (RADAR) device, and a controller. The LIDAR device can include a light source configured to be scanned through a scanning zone while emitting light pulses. The LIDAR device can include a light detector configured to receive returning reflected signals from light-reflective features in the scanning zone, if any. The RADAR device can include an illuminating radio antenna configured to be scanned through the scanning zone. The RADAR device can include a radio receiver configured to detect reflected radio signals from radio-reflective features in the scanning zone, if any. The controller can be configured to instruct the LIDAR device to scan the scanning zone while emitting light pulses. The controller can be further configured to receive information from the LIDAR device indicative of the time delays between emission of the light pulses and reception of the corresponding returning reflected signals. The controller can be further configured to determine, based on the time delays and orientations of the LIDAR device while emitting the light pulses, a three dimensional (3-D) point map. The controller can be further configured to instruct the RADAR device to scan one or more regions of the scanning zone corresponding to one or more light-reflective features indicated by the 3-D point map. The controller can be further configured to determine whether the one or more light-reflective features include a solid material. The controller can determine whether the one or more light-reflective features includes a solid material by, for each of the light-reflective features, determining that the light-reflective feature includes a solid material responsive to detecting a reflected radio signal corresponding to the light-reflective feature. The controller can determine whether the one or more light-reflective features includes a solid material by, for each of the light-reflective features, determining that the light-reflective feature does not include a solid material responsive to not detecting a reflected radio signal corresponding to the light-reflective feature.

Some embodiments of the present disclosure provide a non-transitory computer readable medium storing instructions that, when executed by one or more processors in a computing device, cause the computing device to perform operations including scanning a light detection and ranging (LIDAR) device associated with an autonomous vehicle through a scanning zone while emitting light pulses. The operations can include determining a three-dimensional (3-D) point map of the scanning zone based on time delays between emitting the light pulses and receiving corresponding returning reflected signals and based on orientations of the LIDAR device while emitting the light pulses. The operations can include scanning, with a radio detection and ranging (RADAR) device associated with the autonomous vehicle, one or more regions of the scanning zone corresponding to one or more light-reflective features indicated by the 3-D point map. The operations can include determining whether the one or more light-reflective features include a solid material. The operations can include, for each of the one or more light-reflective features, determining that the light-reflective feature includes a solid material responsive to detecting a reflected radio signal corresponding to the light-reflective feature. The operations can include, for each of the one or more light-reflective features, determining that the light-reflective feature does not include a solid material responsive to not detecting a reflected radio signal corresponding to the light-reflective feature. The operations can include controlling the vehicle to avoid light-reflective features determined to include a solid material.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 3A provides an example depiction of a LIDAR device including beam steering optics.

FIG. 3B symbolically illustrates a LIDAR device scanning across an obstacle-filled environmental scene.

FIG. 3C symbolically illustrates a point cloud corresponding to the obstacle-filled environmental scene of FIG. 3B.

DETAILED DESCRIPTION

Figure 1:
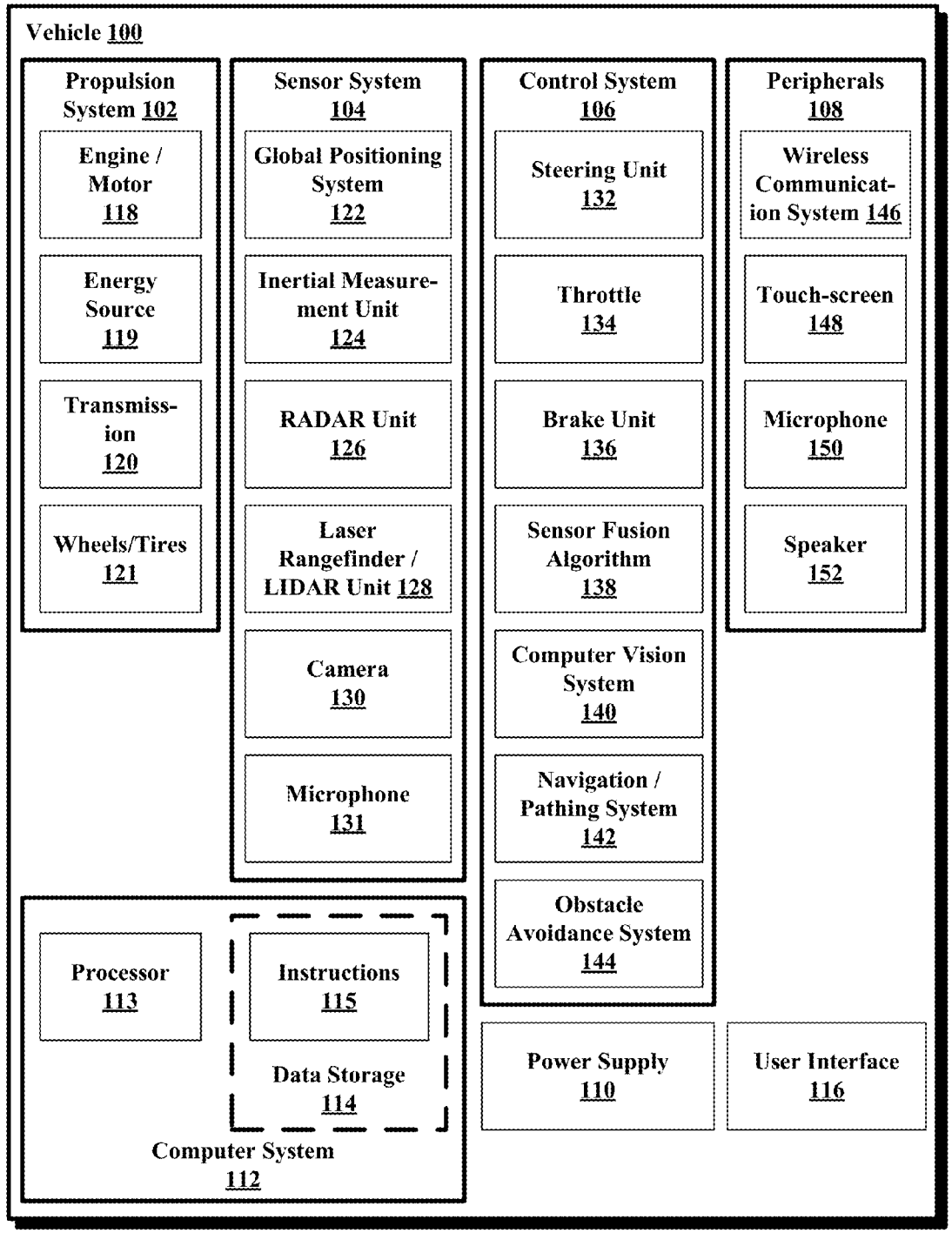
FIG. 1 is a functional block diagram depicting aspects of an autonomous vehicle.

Example embodiments relate to an autonomous vehicle, such as a driverless automobile, that includes a light detection and ranging (LIDAR) sensor for actively detecting reflective features in the environment surrounding the vehicle. A controller analyzes information from the LIDAR sensor to identify the surroundings of the vehicle. The controller determines how to direct the propulsion systems of the vehicle to effect a navigation path that substantially avoids obstacles indicated by the information from the LIDAR sensor.

Each distance measurement of a scanning LIDAR is associated with a point or "spot" on a reflective feature in the environment surrounding the LIDAR from which an emitted pulse is reflected. Scanning the LIDAR through a range of orientations provides a three-dimensional distribution of reflective points, which is referred to herein as a 3-D point map or 3-D point cloud. Spatial features that appear in a 3-D point map generally correspond to objects detected by laser pulses from the LIDAR that bounce off the objects' surfaces. In generating such a 3-D point map, it may not be possible for a conventional LIDAR to determine the physical nature of a detected object, other than the object's distance and shape as revealed by the laser light that bounces off the object's surface and is detected as return pulses. In particular, an object detected by a conventional scanning LIDAR and appearing as a feature in a 3-D point map may not have a solid surface, or even any solid portions within its volume. For example, a cloud of exhaust gas or aggregate drops of water in rain or in a splash of water from a puddle may be detected by a LIDAR and appear in a 3-D point map with either a well-defined shape, or an amorphous shape. Thus, a LIDAR detector is sensitive to non-solid reflective features, even though such features may be safely disregarded for object avoidance and/or navigational purposes of the autonomous vehicle.

For some applications of a scanning LIDAR, it may be necessary or desirable to be able to distinguish between spatial features in a 3-D point map that correspond to detected objects that are at least partially solid and detected objects that are not. For example, a 3-D point map may serve as real-time input to an application and/or system that guides a moving vehicle through a region that may contain physical objects or obstacles in the vehicle's path. In such a situation, safe navigation of the vehicle through the region can depend on avoiding objects that represent collision hazards, such as solid objects, while minimizing or eliminating maneuvers around non-solid reflective features that correspond to objects or materials that could otherwise be safely passed through.

Without the ability to distinguish between solid reflective features and non-solid reflective features, autonomous vehicles can make undesirable maneuvers to the detriment of passenger safety, fuel economy, etc. For example, in cold weather, the exhaust of a car within the scanning zone of the LIDAR can appear reflective, and cause an automatic object avoidance system to unnecessarily maneuver the vehicle around the exhaust. Similarly, during a rainfall, water on the road surface might be thrown up and back by the wheels of a car in the scanning zone of the LIDAR, forming a spray pattern appearing as a lobe or tail trailing each wheel of other cars on the road. The lobe or tail can then be detected by the LIDAR and cause an automatic object avoidance system to unnecessarily maneuver the vehicle to avoid the splashing water, even though such maneuvers are not warranted by a collision hazard.

In some embodiments, a processor-based system including a scanning LIDAR and a RADAR device use the RADAR device to determine whether LIDAR-indicated objects are solid objects. Both water vapor and exhaust plumes are not significantly detected in radio. A RADAR device can then be used to check whether a LIDAR-indicated reflective feature is also detected in radio. If the feature is present in the RADAR scan, the feature is determined to be solid. If the feature is not present in the RADAR scan, the feature is determined to not be solid. Determinations of whether particular LIDAR-indicated reflective features are solid or not can thereby be made in real time by an autonomous vehicle equipped with both LIDAR and RADAR.

Moreover, in some examples, an autonomous vehicle includes both a LIDAR device and a RADAR device that are each scanned continuously throughout a scanning zone. Reflective features indicated by the LIDAR are then determined to be either solid or not solid based on their radio signature. Determining whether LIDAR-indicated reflective features are solid can be carried out by checking the RADAR output for the presence of an object corresponding to the LIDAR-indicated features. Objects represented in both the LIDAR-generated 3-D point map and the RADAR scan are determined to be solid, whereas objects not represented in the RADAR output are determined to not be solid.

In example embodiments, scanning with the RADAR device can be carried out in response to determining the presence and location of a spatial feature or features in the 3-D point map. For example, a light-reflecting feature in the LIDAR-generated 3-D point map that resembles splashing water or an exhaust plume can be recognized and cause the RADAR device to scan the region including such a reflective feature. In some examples, both the LIDAR device and the RADAR device are routinely repeatedly scanned through a scanning zone surrounding the autonomous vehicle and the information from each is combined to determine the spatial distribution of environmental features/objects indicated in both scans. Navigational determinations to guide the autonomous vehicle are then made on the basis of the environmental features/objects in both scans, while features indicated only on the LIDAR scan, but not the RADAR scan, can be ignored by the autonomous vehicle navigation systems.

In example embodiments, the example system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, wireless communication system 146 can communicate with a wireless local area network (WLAN), for example, using WiFi. In some embodiments, wireless communication system 146 could communicate directly with a device, for example, using an infrared link, BLUETOOTH, and/or ZIGBEE. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
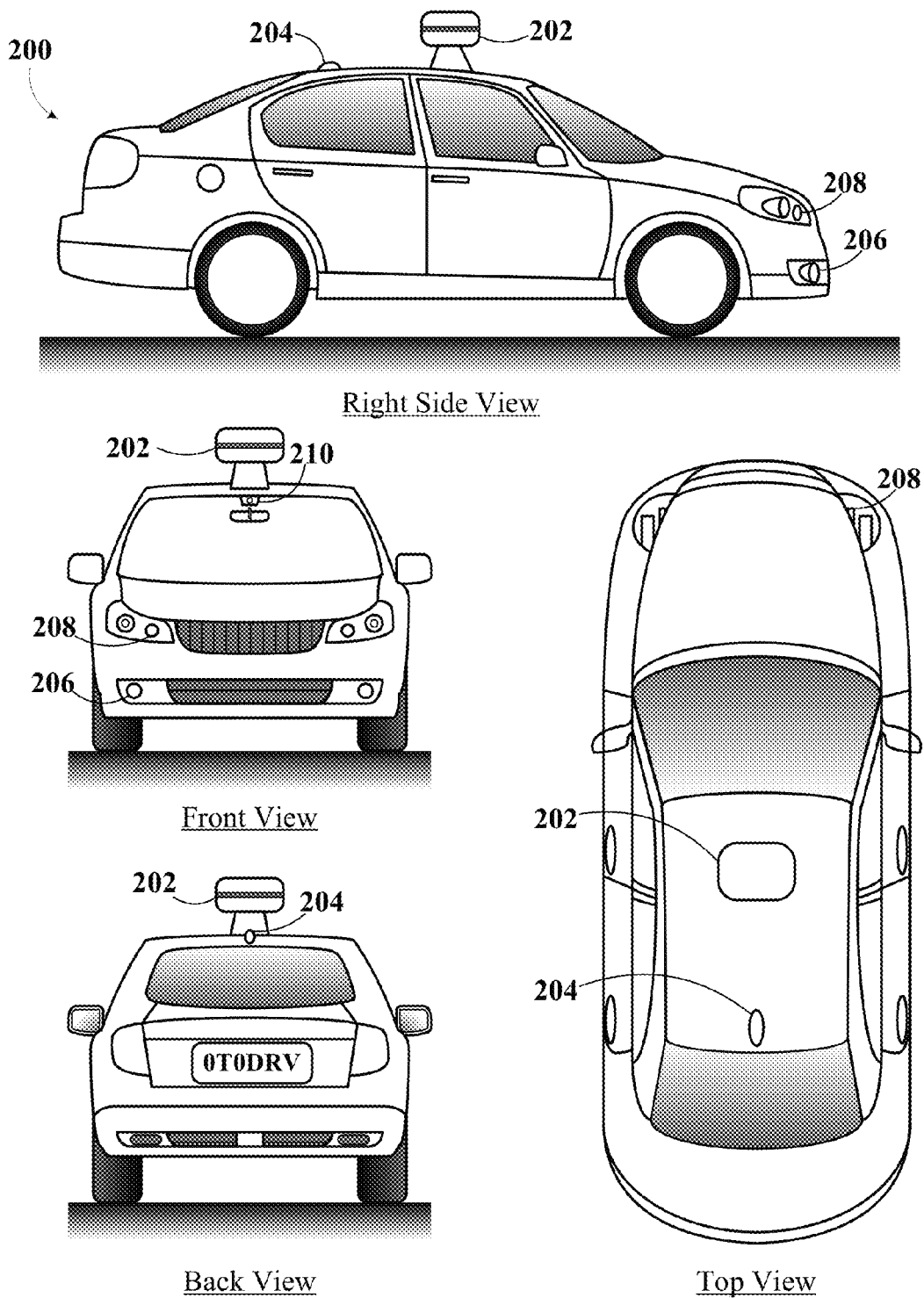
FIG. 2 depicts exterior views of the autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a RADAR unit 206, a laser rangefinder unit 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200.

The camera 210 can have associated optics operable to provide an adjustable field of view. Further, the camera 210 can be mounted to vehicle 200 with a movable mount to vary a pointing angle of the camera 210, such as via a pan/tilt mechanism.

FIG. 3A provides an example depiction of a light detection and ranging (LIDAR) device 302 including beam steering optics 304. A laser beam 306 is directed to the beam steering optics 304. In the example illustrated in FIG. 3A, the beam steering optics 304 is a rotating angled mirror that directs the initially downward facing laser beam 306 to sweep across a scanning zone. As described herein, the beam steering optics 304, which can generally be implemented as a combination of lenses, mirrors, and/or apertures configured to direct the laser beam to sweep across a scanning zone, are interchangeably described as the rotating angled mirror 304. The rotating angled mirror 304 rotates about an axis substantially parallel, and roughly in line with, the initial downward path of the laser beam 306. The rotating angled mirror 304 rotates in the direction indicated by the reference arrow 308 in FIG. 3A.

Although the LIDAR 302 is depicted as having (approximately) a 180 degree range of rotation for the scanning zone of the laser beam 306 via the rotating angled mirror 304, this is for purposes of example and explanation only, as the present disclosure is not so limited. Indeed, as explained above, LIDAR 302 can be configured to have viewing angle (e.g., angular range of available orientations during each sweep), including viewing angles up to and including 360 degrees. Further, although LIDAR 302 is depicted with the single laser beam 306 and a single mirror 304, this is for purposes of example and explanation only, as the present disclosure is not so limited. Indeed, as explained above, LIDAR 302 can include multiple laser beams operating simultaneously or sequentially to provide greater sampling coverage of the surrounding environment. The LIDAR 302 also includes, or works in concert with, additional optical sensors (not shown) configured to detect the reflection of laser beam 306 from features/objects in the surrounding environment with sufficient temporal sensitivity to determine distances to the reflective features. For example, with reference to the vehicle 200 in FIG. 2, such optical sensors can optionally be co-located with the top-mounted sensors 204 on the autonomous vehicle 200.

FIG. 3B symbolically illustrates the LIDAR device 302 scanning across an obstacle-filled environmental scene. The example vehicular environment depicted in FIG. 3B includes a car 310 and a tree 312. In operation, LIDAR 302 rotates according to motion reference arrow 308 with angular velocity ω. While rotating, the LIDAR 302 regularly (e.g., periodically) emits laser beams, such as the laser beam 306. Reflections from the emitted laser beams by objects in the environment, such as vehicle 310 and tree 312, are then received by suitable sensors. Precisely time-stamping the receipt of the reflected signals allows for associating each reflected signal (if any is received at all) with the most recently emitted laser pulse, and measuring the time delay between emission of the laser pulse and reception of the reflected light. The time delay provides an estimate of the distance to the reflective feature by scaling according to the speed of light in the intervening atmosphere. Combining the distance information for each reflected signal with the orientation of the LIDAR device 302 for the respective pulse emission allows for determining a position of the reflective feature in three-dimensions. For illustrative purposes, the environmental scene in FIG. 3B is described in the two-dimensional x-y plane in connection with a single sweep of the LIDAR device 302 that estimates positions to a series of points located in the x-y plane. However, it is noted that a more complete three-dimensional sampling is provided by either adjusting the beam steering optics 304 to direct the laser beam 306 up or down from the x-y plane on its next sweep of the scene or by providing additional lasers and associated beam steering optics dedicated to sampling point locations in planes above and below the x-y plane shown in FIG. 3B, or combinations of these.

FIG. 3C symbolically illustrates a point cloud corresponding to the obstacle-filled environmental scene of FIG. 3B. Spatial-point data (represented by stars) are shown from a ground-plane (or aerial) perspective. Even though the individual points are not equally spatially distributed throughout the sampled environment, adjacent sampled points are roughly equally angularly spaced with respect to the LIDAR device 302. Car spatial data 314 correspond to measured points on the surface of the car 310 with a line of sight to the LIDAR device 302. Similarly, tree spatial data 316 correspond to measured points on the surface of the tree 312 visible from the LIDAR device 302.

Each point in the example point cloud illustrated symbolically in FIG. 3C can be referenced by an azimuth angle φ (e.g. orientation of the LIDAR device 302 while emitting the pulse corresponding to the point, which is determined by the orientation of the rotating angled mirror 304) and a line-of-sight (LOS) distance (e.g., the distance indicated by the time delay between pulse emission and reflected light reception). For pulses that do not result in a returning reflected signal, the distance in the 3-D point map can optionally be set to the maximum distance sensitivity of the LIDAR device 302. The maximum distance sensitivity can be determined according to the maximum time delay the associated optical sensors wait for a return reflected signal following each pulse emission, which can itself be set according to the anticipated signal strength of a reflected signal at a particular distance given ambient lighting conditions, intensity of the emitted pulse, predicted reflectivity of environmental features, etc. In some examples, the maximum distance can be approximately 60 meters, 80 meters, 100 meters, or 150 meters, but other examples are possible for particular configurations of the LIDAR device 302 and associated optical sensors.

In some embodiments, the sensor fusion algorithm 138, computer vision system 140, and/or computer system 112, can interpret the car spatial data 314 alone and/or in combination with additional sensor-indicated information and/or memory-based pattern-matching point clouds and/or baseline maps of the environment to categorize or identify the group of points 314 as corresponding to the car 310. Similarly, the tree spatial data 316 can identified as corresponding to the tree 310 in accordance with a suitable object-detection technique. As described further herein, some embodiments of the present disclosure provide for identifying a region of the point cloud for study with enhanced resolution scanning technique on the basis of the already-sampled spatial-points.

Further, as noted above, each spatial point can be associated with a respective laser from a set of lasers and a respective timestamp. That is, in an embodiment where the LIDAR 302 includes multiple lasers, each respective received spatial point can be associated with the particular laser that was detected in accordance with the respective received spatial point. Additionally, each respective spatial point can be associated with a respective timestamp (e.g., a time at which laser was emitted or received). In this way, the received spatial points may be organized, identified, or otherwise ordered on a spatial (laser identification) and/or temporal (timestamp) basis. Such an ordering may assist or improve an analysis of the spatial-point data by allowing for organizing the spatial-point data into a meaningful order.

Figure 4A:
FIG. 4A is an image of an example roadway approaching an intersection.
Figure 4B:
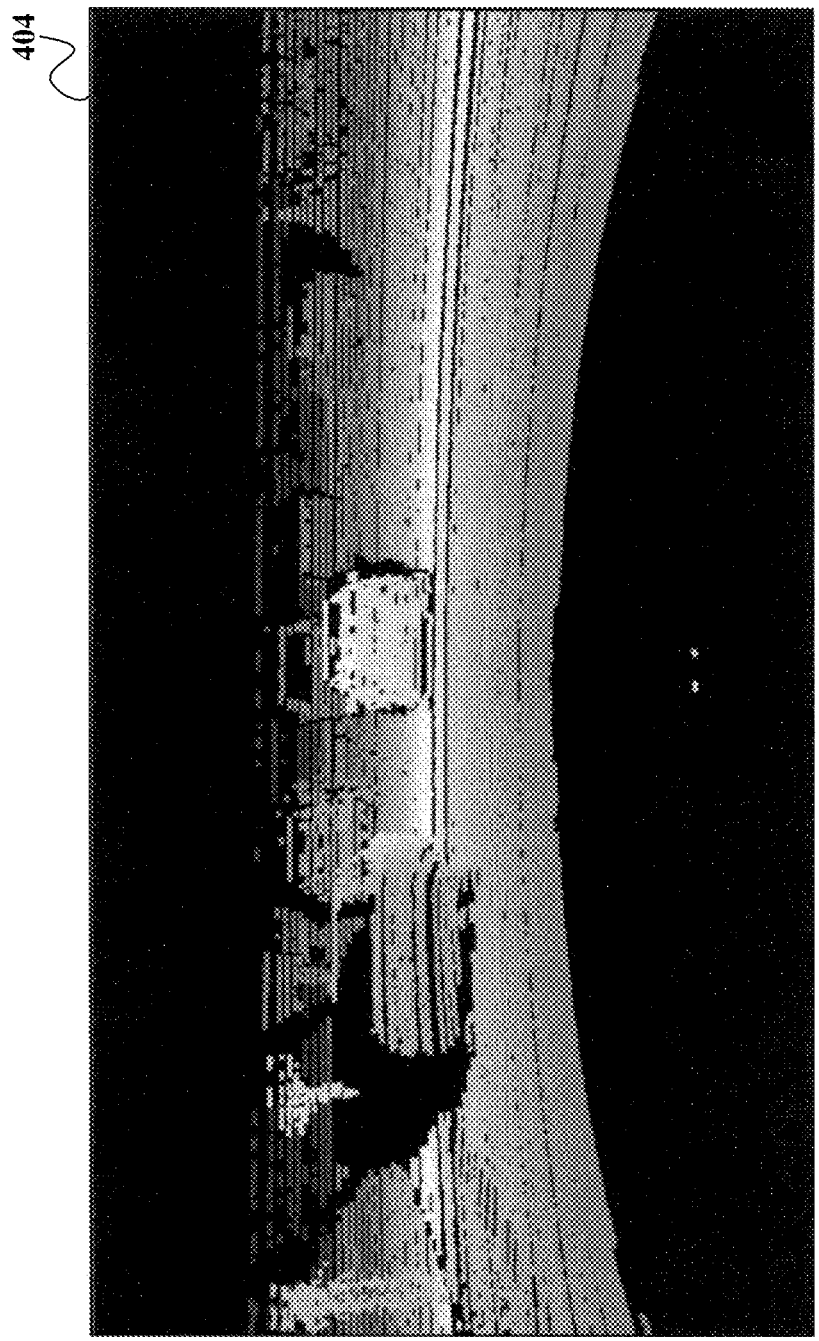
FIG. 4B is a rendering of a LIDAR-indicated point cloud corresponding to the scene pictured in FIG. 4A.
Figure 4C:
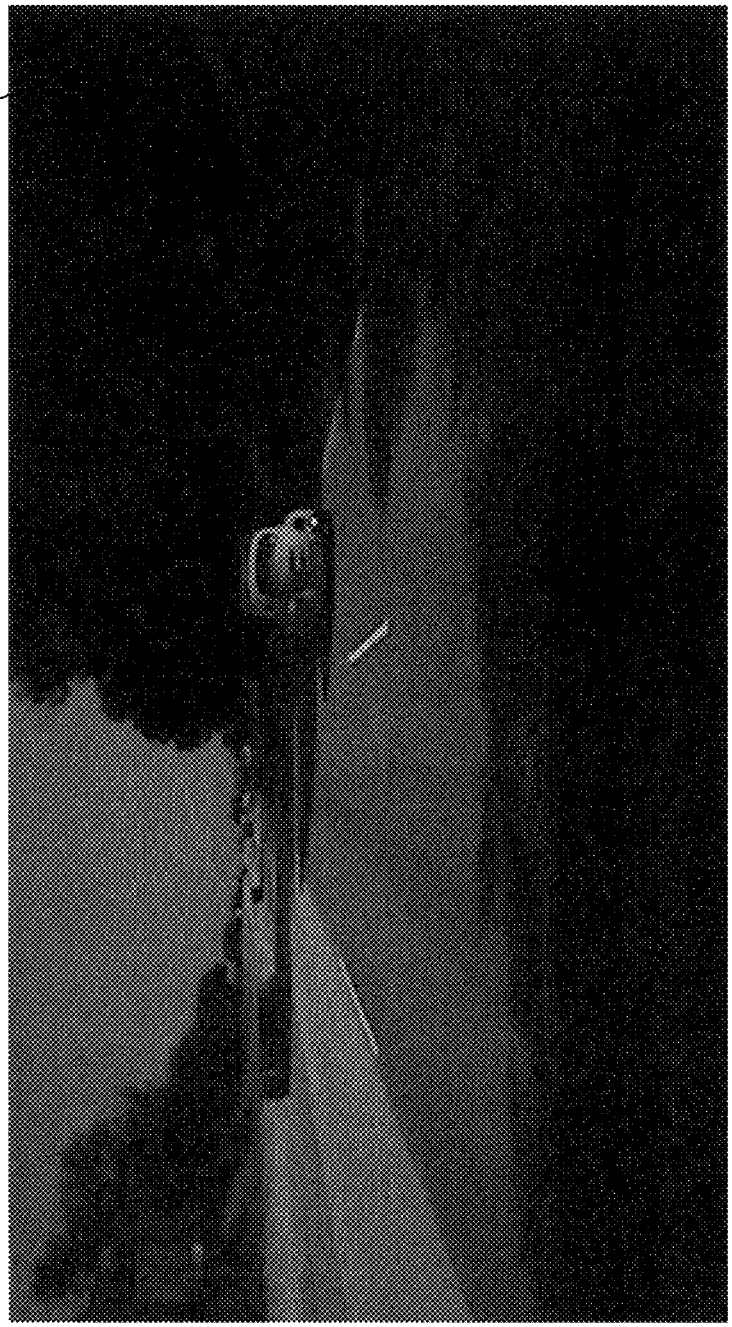
FIG. 4C is an image of another example roadway.
Figure 4D:
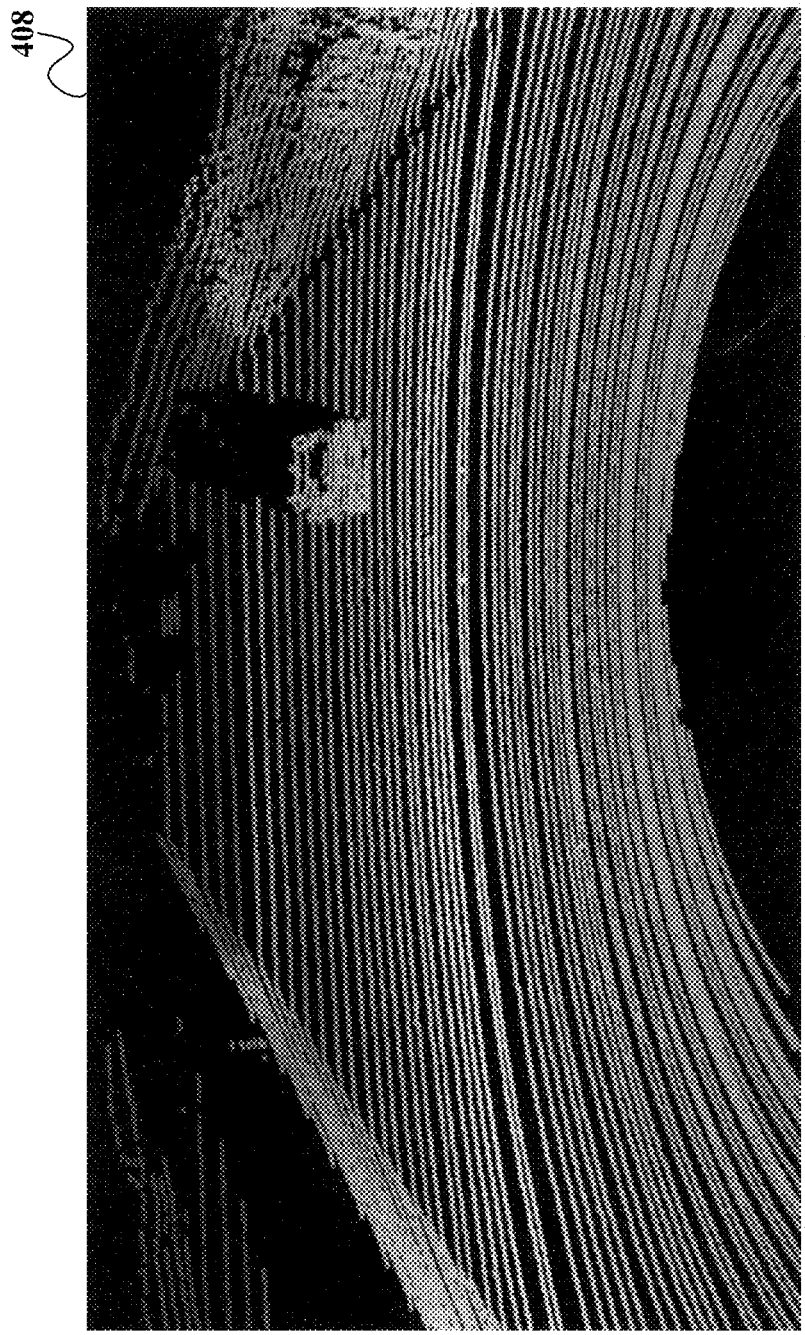
FIG. 4D is a rendering of a LIDAR-indicated point cloud corresponding to the scene pictured in FIG. 4C.

FIG. 4A is a raw camera image of an example roadway scene 402 approaching an intersection. FIG. 4B is a rendering of a LIDAR-indicated point cloud 404 corresponding to the scene 402 pictured in FIG. 4A. FIG. 4C is a raw camera image of another example roadway scene 406. FIG. 4D is a rendering of a LIDAR-indicated point cloud 408 corresponding to the scene 406 pictured in FIG. 4C.

With reference to the vehicle 200 of FIG. 2, the camera images 402, 406 of FIGS. 4A and 4C can be captured by the camera 210 of the vehicle 200, and the corresponding point cloud maps 404, 408 of FIGS. 4B and 4D can be captured by the LIDAR sensor 202. As shown in the examples of FIGS. 4B and 4D, a laser point cloud image may substantially or approximately correspond to a raw camera image captured by a camera. Moreover, FIGS. 4B and 4D show that LIDAR-indicated point cloud maps for the distinct environmental scenes 402, 406 (i.e., the images in FIGS. 4A and 4C) result in distinct point maps 404, 408 which correspond to their respective scenes. For clarity it is noted that each "line" depicted in FIGS. 4B and 4D generally corresponds to a series of spatial points collected by a particular, single, laser of LIDAR 202.

For purposes of context, example, and explanation, an overview of general approaches to object detection is provided below in connection with an example LIDAR device. As noted above, example vehicle 100 includes a LIDAR device 128. LIDAR 128 actively captures laser point cloud images using one or more lasers. The laser point cloud includes many points for each pulse emitted from the LIDAR device 128: reflected signals indicate actual locations of reflective objects, whereas failing to receive reflected signals indicate an absence of sufficiently reflective objects within a particular distance along the line of sight of the laser. Depending on factors including the laser pulse rate, the scene refresh rate, the total solid angle sampled by each LIDAR device (or just the total solid angle of the scene, where only one LIDAR device is used), the number of sample points in each point cloud can be determined. Some embodiments can provide point clouds with as many as 50,000 laser-indicated points, 80,000 laser-indicated points, 100,000 laser-indicated points, etc. Generally, the number of laser-indicated points in each point cloud is a tradeoff between angular resolution on the one hand, and refresh rate on the other hand. The LIDAR device is driven to provide an angular resolution at a sufficiently high refresh rate to be relevant to real time navigational decisions for an autonomous vehicle. Thus, the LIDAR 128 can be configured to capture one or more laser point clouds of the scanning zone at predetermined time intervals, such as 100 milliseconds (to achieve a refresh rate of 10 frames per second), 33 milliseconds (to achieve a refresh rate of 30 frames per second), 1 millisecond, 1 second, etc.

Data storage 114 of computer system 112 of vehicle 100 can store object-detector software, code, or other program instructions. Such object-detector software can include, or be part of, one or more of the control systems 106 described above, including the sensor fusion algorithm 138, computer vision system 140, and/or obstacle avoidance system 144. The object detector may be any configuration of software and/or hardware configured to perceive features in the environmental scene by categorizing and/or identifying objects based on the laser point clouds captured by the LIDAR 128 and/or based on one or more of the sensors in sensor system 104. As a laser point cloud is captured via LIDAR 128, data indicative of the captured point cloud is communicated to the object detector, which analyzes the data to determine whether there is an object present in the laser point cloud. Objects indicated by the point cloud may be, for example, a vehicle, a pedestrian, a road sign, a traffic light, a traffic cone, etc.

To determine whether an object is present in a laser point cloud image, the object detector software and/or module can associate arrangements of laser-indicated points with patterns matching objects, environmental features, and/or categories of objects or features. The object detector can be pre-loaded (or dynamically instructed) to associate arrangements according to one or more parameters corresponding to physical objects/features in the environment surrounding the vehicle 100. For example, the object detector can be pre-loaded with information indicating a typical height of a pedestrian, a length of a typical automobile, confidence thresholds for classifying suspected objects, etc.

When the object detector identifies an object in point cloud, the object detector can define a bounding box encompassing the object that. For example, the bounding box can correspond to a predicted exterior surface of the point cloud indicated object. Of course, the bounding "box" can generally take the form of a multi-sided closed shape defining the predicted outer boundaries of the object.

For each captured point cloud, positions of perceived objects and their corresponding boundary definitions are associated with a frame number or frame time. Thus, similarly shaped objects appearing in roughly similar locations in successive scans of the scene can be associated with one another to track objects in time. For perceived objects appearing in multiple point cloud frames (e.g., complete scans of the scanning zone), the object can be associated, for each frame on which the object appears, with a distinct bounding shape defining the dimensional extent of the perceived object.

Perceived objects can be tracked as the vehicle 100 travels through its surrounding environment and/or as objects move with respect to the vehicle so as to pass through the scanning zone of the LIDAR 128. Combining two or more successively captured point clouds can thereby allow for determining translation information for detected objects. Future position predictions can be made for objects with characterized motion profiles, such as by observing acceleration and/or velocity of objects such as cars moving along the roadway with the vehicle 100 to predict the location of the object during a subsequent scan. In some embodiments, objects moving through the air are assumed to move along a trajectory influenced by the force of gravity.

To assist in providing object recognition, the vehicle 100 can also be in communication with an object-identification server (e.g., via the wireless communication system 146). The object-identification server can verify and/or classify objects detected by vehicle 100 using the object detector. Moreover, the object-identification server can facilitate optimization of one or more of the parameters used by the object detector to detect objects in the captured laser point cloud based on accumulated data from other similar systems, local conditions. In one embodiment, vehicle 100 can communicate the object boundaries, and their corresponding object parameters, to the object identification server for verification that the perceived objects are correctly identified, such as indicated by an evaluation for statistical likelihood of correct identification.

Figure 5A:
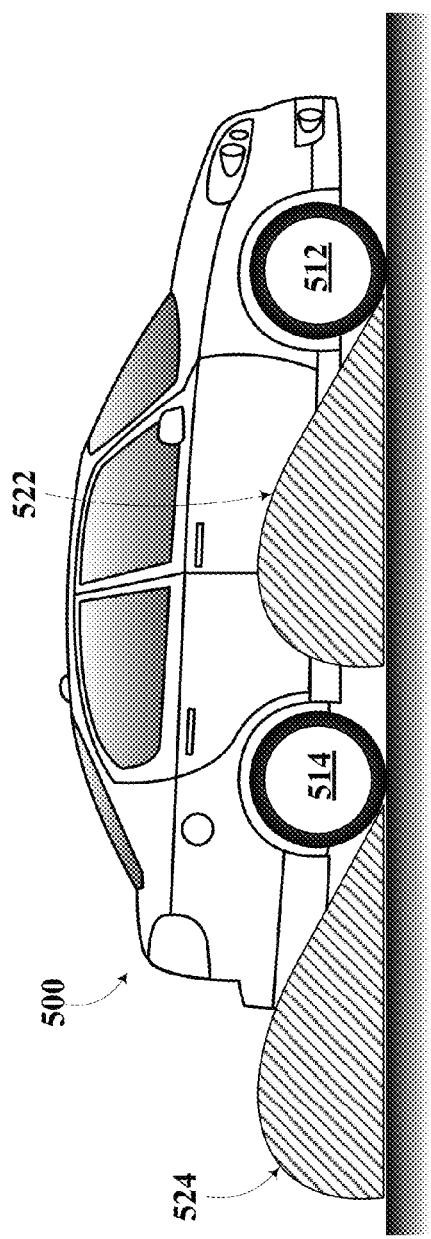
FIG. 5A is a side view of a car driving on wet pavement so as to generate a distribution of water trailing each wheel.
Figure 5C:
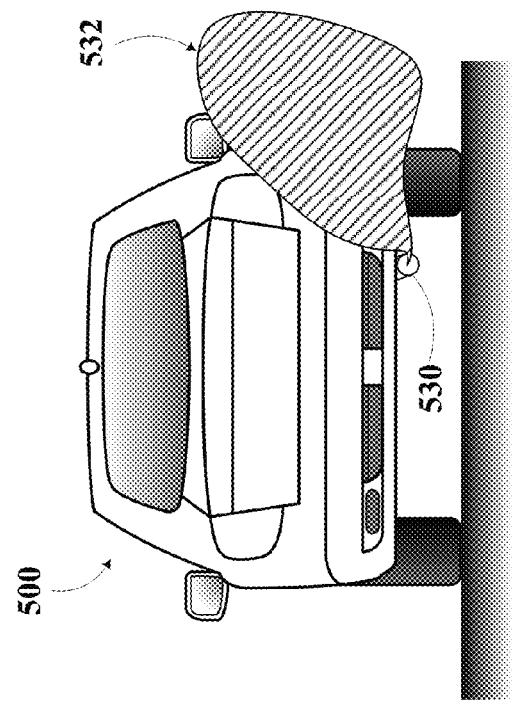
FIG. 5C is a back view of a car emitting a plume of exhaust gas from a rear tail pipe.
Figure 5B:
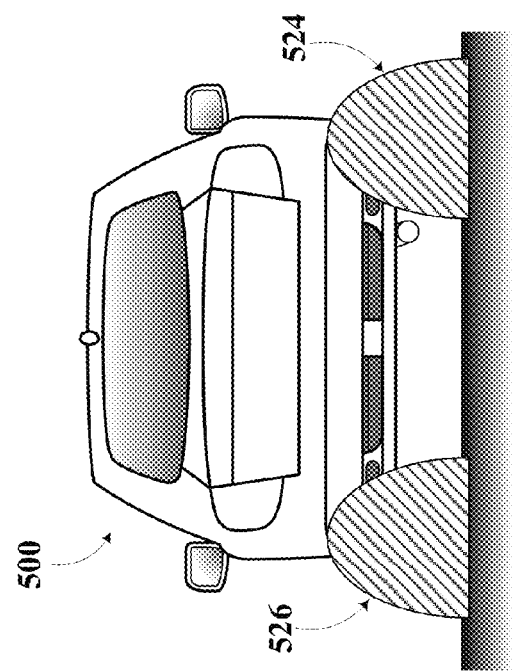
FIG. 5B is a back view of a car driving on wet pavement so as to generate a distribution of water trailing each wheel.

FIGS. 5A-5C illustrate exemplary non-solid reflective features that can be detected by a LIDAR. As described above, for an autonomous vehicle configured to automatically adjust navigational decisions so as to avoid obstacles perceived in the path of the vehicle, it is desirable to differentiate between non-solid features that do not present obstacles and solid features that do. As described herein, a hyperspectral sensor can be employed to spectrally characterize suspect reflective features, and the feature can be characterized as solid or non-solid by identifying the material in the feature based on the spectral signature of the feature.

FIG. 5A is a side view of a car 500 driving on wet pavement so as to generate a distribution of water (e.g., the spray patterns 522, 524) trailing each wheel (e.g., the wheels 512, 514). FIG. 5B is a back view of the car 500 driving on wet pavement so as to generate a distribution of water (e.g., the spray patterns 526, 524) trailing each wheel (not visible). On wet pavement, treads on the tires of the wheels 512, 514 displace water away from the footprint of the tires to allow the raised portions of the tires to achieve traction with the pavement. Generally, standing water is displaced to either side of the tires and some remains in the grooves of the tire treads. As the tire continues to rotate away from the pavement, water in the grooves of the tire treads initially travels with the rotation and is projected tangentially away from the edge of the rotating tire. As the individual droplets of water are directed tangentially up and away from the bottom of the rotating tire, a spray pattern of water droplets results from the distribution of water droplets. While a turbulent process, the spray pattern can be considered a grouping of water droplets each generally traveling trajectories originating substantially tangential to the edge of the rotating tire, and falling under the force of gravity and atmospheric drag to return to the pavement surface. In some embodiments, a portion of the water spray can be influenced by a surface of the car 500, such as a mud flap, bumper, rocker panel, etc. The combination of many such droplets provides characteristic distributions of water spray that can resemble elongated lobes trailing each tire. Of course, depending on the tread pattern of the tires, the depth of the standing water, the shape of the body of the car 500, the speed of the car 500, etc., the distribution of water droplets can have other shapes and may be non-uniform.

For example, while traveling on wet surface, water in the treads of the tire on the front wheel 512 is conveyed tangentially away from the front wheel 512 and falls back to the pavement to form the spray pattern 522 trailing the front wheel 512. Similarly, water in the treads of the tire on the wheel 514 is conveyed tangentially away from the wheel 514 and falls back to the pavement to form the spray pattern 524 trailing the wheel 514. Another spray pattern 526 trails the second rear wheel.

FIG. 5C is a back view of the car 500 emitting a plume 532 of exhaust gas from a rear tail pipe 530. The tail pipe 530 discharges exhaust gas from a combustion chamber inside an engine of the car 500 that converts chemical fuel energy to mechanical energy to power the car 500. The exhaust gas is generally at a higher temperature than ambient air, and so it disperses from the tail pipe 530 in a plume pattern 532 characterized by the tendency of the heated gas to rise in the ambient air and also disperse by convection according to the direction of prevailing winds. Furthermore, while the car 500 is in motion, the exhaust plume 532 generally trails behind the car 500. The exhaust plume 532 is formed by a combination of heated gases (e.g., nitrogen, oxygen, water vapor, carbon dioxide, carbon monoxide, etc.) and particulates (e.g., hydrocarbons, soot, oxides, etc.) that disperse to the ambient air from the tail pipe 530. Upon emission, the gases thermally regulate with the surrounding air, and the constituents of the exhaust gas diffuse to the surrounding air such that the exhaust becomes substantially indistinguishable. The characteristic exhaust plume 532 is therefore continuously regenerated by exhausted heated gases and particulates emitted from the tail pipe 530 so as to maintain the characteristic plume pattern 532.

To a LIDAR device, which detects and locates optically reflective features, the spray patterns 522-526 resemble a reflective object, because light pulses are reflected from the individual water droplets dispersed throughout the spray pattern. From the rear, the resulting spray patterns 524, 526 can be interpreted by a LIDAR as a pair of extended lobes extending behind the car 500. Similarly, the exhaust plume 532 resembles a reflective cloud, because light pulses are reflected from the particulates, such as water droplets, particulates due to incomplete exhaustion reactions, etc, dispersed throughout the exhaust cloud 532. The temperature of the ambient air can influence the perception of the exhaust plume 532. For example, water droplets formed by condensation within the exhausted gases are formed more quickly (i.e., closer to the tail pipe 530) when the ambient temperature is cold than when the ambient temperature is hot and condensation occurs more slowly (i.e., further from the tail pipe 530). Thus, the exhaust plume 532 can be more readily apparent on cold days, because water droplets are formed in greater numbers closer to the tail pipe 530 and the spatial density of reflective water droplets near the tail pipe 530 is increased. Similarly, the exhaust plume 532 can be more readily apparent immediately after a car is started while it is still warming up, because the exhaust gases emitted from the tail pipe 530 are relatively colder than after the exhaust gases warm to their normal operating temperature, and as a result water droplets form more readily closer to the tail pipe 530.

Figure 6:
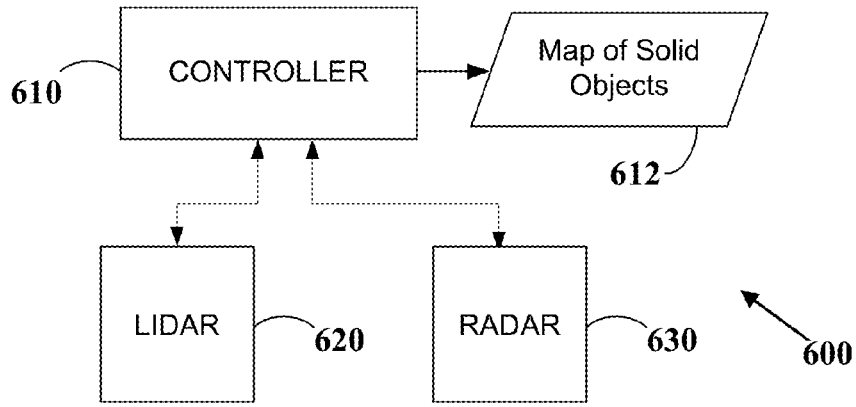
FIG. 6 is a block diagram of an autonomous vehicle system that employs a RADAR device to determine whether a LIDAR-indicated reflective feature includes a solid material.

FIG. 6 is a block diagram of an autonomous vehicle system 600 that employs a RADAR device 630 to determine whether a LIDAR-indicated reflective feature includes a solid material. The system 600 includes both a LIDAR device 620 and a RADAR device 630 configured to actively detect and locate objects in a scanning zone mapped by the system 600. A controller 610 communicates with the LIDAR device 620 and the RADAR device 630 and combines the scanning information from both to create a map of solid objects 612. The LIDAR device 620 can be the same or similar to the LIDAR device 302 discussed in connection with FIGS. 3A-3C above. The LIDAR device 620 can scan the surrounding environment for reflective objects with a visible and/or infrared laser (or other light source). The LIDAR device 620 outputs data to construct a 3-D point cloud of locations of light-reflective points in the surrounding environment where each point corresponds to an emitted pulse of light from the LIDAR device 620. Each point in the 3-D point cloud can be determined based on the orientation of the LIDAR laser and the time delay associated with a detected reflection light pulse. The RADAR device 630 outputs data to construct a point cloud of radio-reflective points in the surrounding environment where each point is determined according to a time delay of a detected radio reflection. It is noted that multiple LIDAR devices and/or RADAR devices can optionally be included in the system 600 to combine to provide coverage of light-reflective and/or radio-reflective features.

The RADAR device 630 can include an illuminating antenna that is used to illuminate the scanning zone with radio radiation. The illuminating antenna can be a directional antenna and/or a phase-controlled array of radio antennas to selectively illuminate portions of the scanning zone. The RADAR device 630 is sensitive to time delays of reflected radio signals to indicate distances to features reflecting the emitted radio signals. Time delays between emitting the illuminating radio frequency radiation and receiving a corresponding reflected signal indicate the distance to the radio-reflective feature. The measured time delay between emission and reception is the time for radiation to travel twice the distance between the RADAR device 630 and the radio-reflective object at the speed of light. A radio-reflective map of the surrounding environment can be dynamically generated based on the distances measured for each reflected signal and the orientations of the illuminating beam of radio radiation during each emission of radio radiation. Other techniques for actively detecting ranges to radio-reflective objects can also be employed by the RADAR device 630.

The RADAR device 630 can also detect frequency shifts in the reflected signals, relative to the illuminating radio radiation. The frequency shift information can be used by the controller 610 to estimate relative velocities of detected radio-reflective objects. For example, due to the Doppler effect radio-reflective objects moving closer to the RADAR device 630 (and the vehicle associated with the system 600) produce reflected radio signals with a higher frequency than the emitted radiation that is reflected. Similarly, due to the Doppler effect, radio reflective objects moving further from the RADAR device 630 (and the vehicle associated with the system 600) produce reflected radio signals with a lower frequency than the emitted radiation that is reflected. Thus, based on the Doppler frequency shifts of reflected radio signals, the velocity of environmental features/objects along a line of sight of the RADAR device 630 can be estimated in the controller 610.

The RADAR device 630 and/or LIDAR device 620 can be operated according to instructions (e.g., command/control signals) from the controller 610. Outputs of the RADAR 630 and LIDAR 620 can be communicated to the controller 610 for analysis of the combined information. The controller 610 can, for example, receive data indicative of three dimensional locations of reflective points in the surrounding environment (e.g., from the LIDAR device 620 and/or RADAR device 630). For example, the controller 610 can be implemented via the computer system 112 of the vehicle 100 and the controller can combine the LIDAR and RADAR device outputs 620, 630 via the sensor fusion algorithm 138, and/or computer vision system 140, etc.

In some embodiments, the LIDAR device 620 can be mounted to the vehicle 200, such as in the sensor unit 202. The RADAR device 630 can also be mounted to the vehicle 200, such as in the front bumper similar to the RADAR unit 206. The LIDAR device 620 can be operated to repetitively scan the surrounding environment to create a substantially continuously updated 3-D point map of light reflective features/objects. In some examples, the LIDAR device 620 can be operated at a 10 Hz refresh rate (e.g., a complete scan of the surrounding environment is repeated 10 times per second). Similarly, the RADAR device 630 can be operated to repetitively scan the surrounding the environment for the presence of radio-reflective features/objects. The RADAR device 630 can be operated at a 15 Hz refresh rate (e.g., a complete scan is repeated 15 times per second). Alternative refresh rates can be used for the LIDAR device 620 and/or RADAR device 630. A real-time updated 3-D point map can be used by the autonomous vehicle 100 to inform real time navigational decisions to, for example, avoid obstacles perceived via the 3-D point map (e.g., via the navigation/pathing system 142 and/or obstacle avoidance system 144).

Some non-solid objects reflect visible and/or infrared light from the LIDAR device 620, but not radio radiation from the RADAR device 630. For example, a distribution of water droplets can reflect visible or infrared reflect light (such as emitted by the LIDAR device 620), but not reflect radio radiation (such as emitted by the RADAR device 630). Distributions of water droplets can therefore generate reflected returning signals detected by the LIDAR device 620, but not the RADAR device 630. Examples of water droplet distributions detected by the LIDAR device 620, but not the RADAR device 630 can include fog, snow, rain, water spray patterns due to water projected from treads of a rotating tire (e.g., the water spray patterns 522, 524 shown in FIGS. 5A-5B), or exhaust plumes due to droplet formation in cooling exhaust gases (e.g., the exhaust plume 532 shown in FIG. 5C). Other non-solid materials that are detected by the LIDAR device 620, but not the RADAR device 630 can include: splashing mud (e.g., due to another car projecting mud from its rotating tires), smoke (e.g., due to exhaust particulates associated with incomplete combustion reactions or due to a fire, etc.), or snow with embedded soot, etc.

The system 600 can be configured to distinguish among materials in the surrounding environment according to the wavelength-dependent reflectivity of the environmental materials. For example, the outputs from both the LIDAR device 620 (which actively detects objects reflecting visible and/or infrared radiation) and the RADAR device 630 (which actively detects objects reflecting radio radiation) can be combined to characterize objects as light-reflective and/or radio-reflective. For example, patterns of water droplets present in fog, exhaust plumes, splashing water, etc., can reflect light from the LIDAR device 620, but not radio radiation from the RADAR device 630. Where features are indicated by the LIDAR scan and the RADAR scan, such features can be assumed to include solid materials. On the other hand, where features are indicated by the LIDAR scan, but not the RADAR scan, such features can be assumed to not include solid materials. Thus, the absence of radio-reflectivity of non-solid materials can be employed by the system 600 to identify non-solid objects from among light-reflective features indicated by the LIDAR scan.

According to some embodiments of the present disclosure, light-reflective features that are not radio-reflective are associated with non-solid materials, whereas light-reflective features that are also radio-reflective are associated solid materials. A map of solid objects 612 in the scanning zone can be constructed based on the output of the LIDAR scan by removing any features indicated by the LIDAR scan that do not have corresponding reflected radio signals ("radio signatures") in the RADAR scans.

In the system 600, the controller 610 operates the LIDAR device 620 and the RADAR device 630 to characterize the radio-reflectivity of light-reflecting features indicated by a scan with the LIDAR device 620. The controller 610 interprets the output from the RADAR device 630 to associate the light-reflective features with either solid materials or not solid materials and output the map of solid objects 612 in the environment surrounding the system 600.

Figure 7:
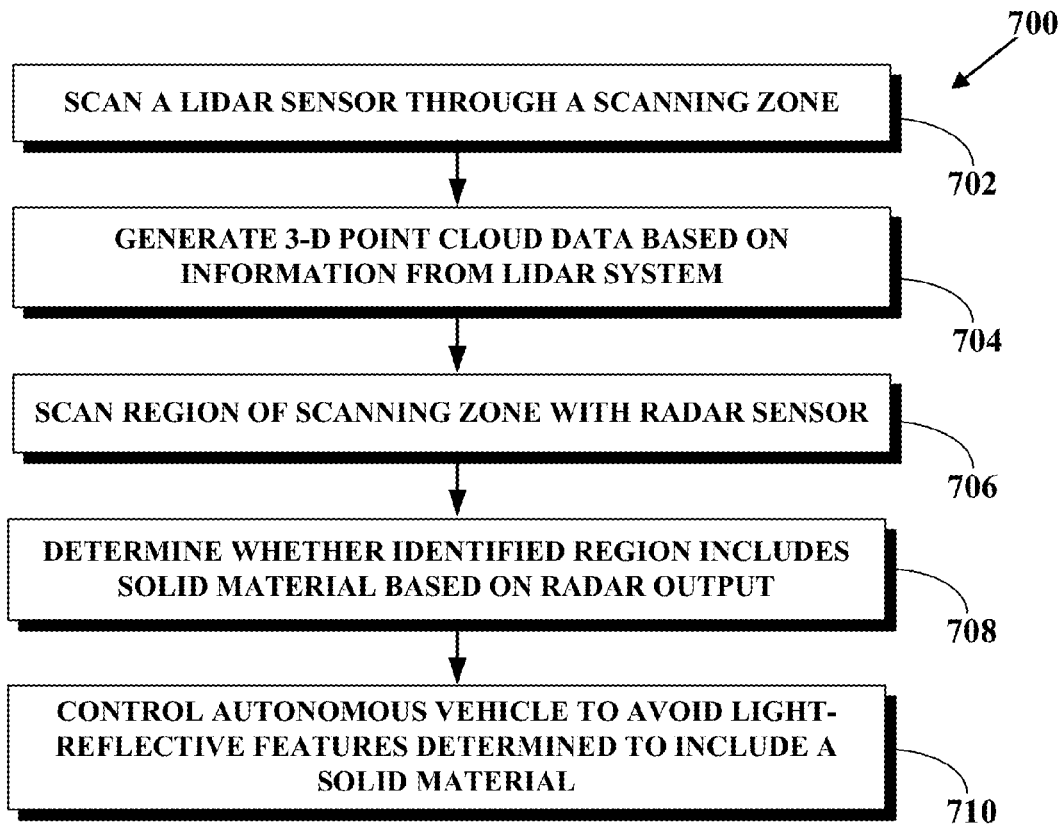
FIG. 7 is a flowchart of a process for employing the system of FIG. 6 to whether a light-reflective feature includes a solid material.

FIG. 7 is a flowchart 700 of a process for employing the system 600 of FIG. 6 to whether a light-reflective feature includes a solid material. The LIDAR device 620 is scanned through a scanning zone (702). The controller 610 generates a three-dimensional (3-D) point cloud based on information from the LIDAR device 620 (704). For example, the LIDAR device 620 and/or associated optical detectors can output information indicative of time delays for reflected light signals corresponding to emitted light pulses to reach the optical detectors. The LIDAR device 620 can also provide information indicative of the orientation of the LIDAR device 620 for each pulse emission such that a direction and distance is associated with each returned reflected light signal to generate the 3-D point cloud. A region of the scanning zone is scanned with the RADAR device 630 to characterize the radio reflectivity of the region (706). In some embodiments, the RADAR device 630 is regularly and repeatedly scanned across the scanning zone, but in some examples, the RADAR device 630 can be scanned across specified regions of the scanning zone, such as regions including light-reflective features. In some embodiments, the controller 610, sensor fusion algorithm 138, and/or computer visions system 140, etc. analyze the LIDAR indicated 3-D point cloud and identify a region to analyze with the RADAR device 630.

The output from the RADAR device 630 is analyzed to determine whether a solid material is included in the region (708). For example, where the output from the RADAR device 630 includes an indication of a radio-reflective feature in the scanned region, the region can be determined to include a solid material. On the other hand, where the output from the RADAR device 630 does not include an indication of a radio-reflective feature in the scanned region, the region can be determined to not include a solid material. An autonomous vehicle associated with the LIDAR device 620 and RADAR device 630 is controlled to avoid those light-reflective features determined to include a solid material (i.e., solid features) (710). Solid features to avoid can be, for example, LIDAR-indicated reflective features with a corresponding radio-reflective signature. Non-solid features (e.g., light-reflective features to not include a solid material based on their lack of a corresponding radio-reflective signature) can be disregarded for navigational and/or object avoidance purposes. Such non-solid features can include, for example, splashing water, mud, foliage, etc., that have weak or non-existent radio-reflective signatures such that such features are not detected with the RADAR device 630.

Figure 8:
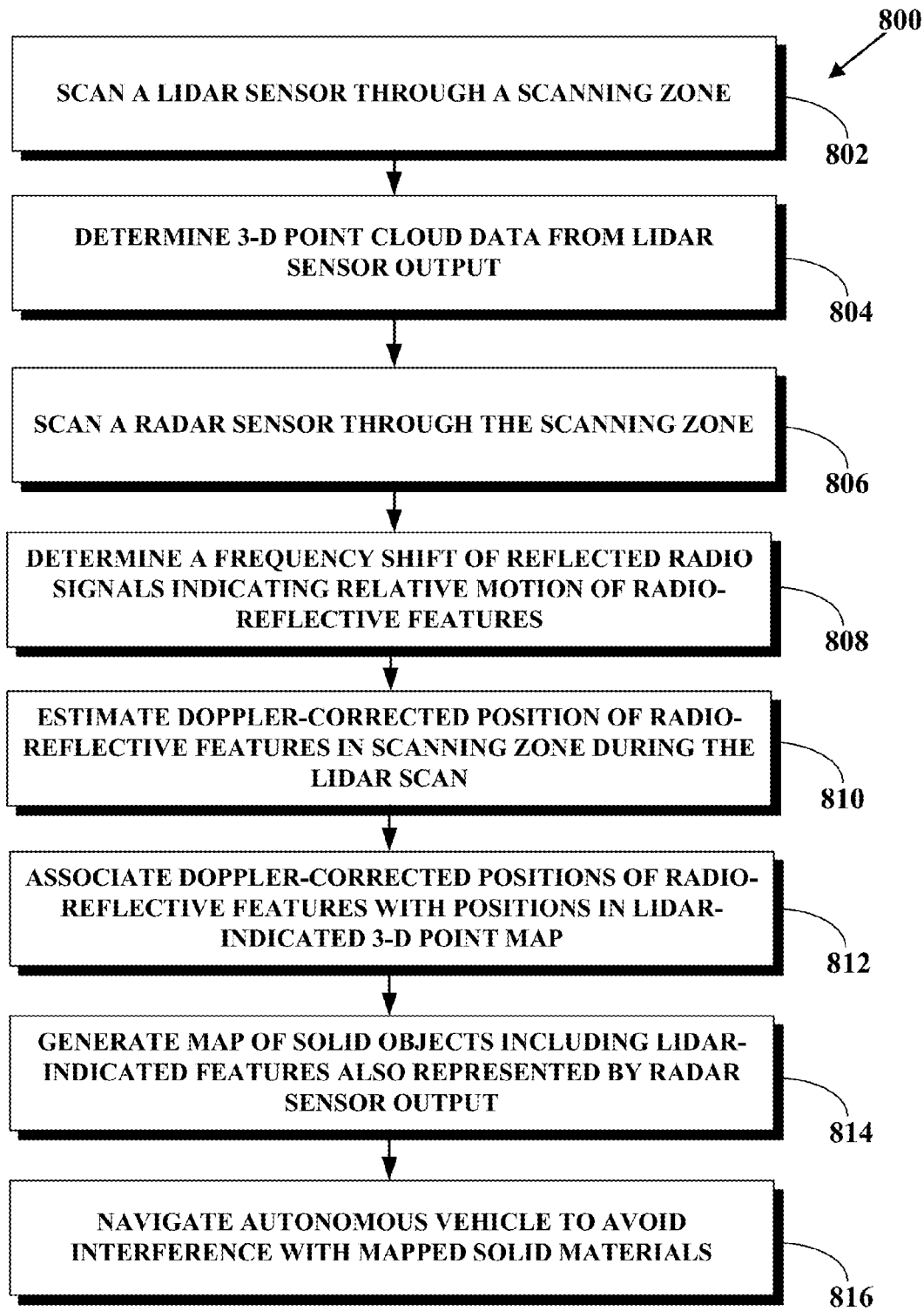
FIG. 8 is a flowchart of a process for navigating an autonomous vehicle according to real time environmental feedback information from both the LIDAR device and the RADAR device.

FIG. 8 is a flowchart 800 of a process for navigating an autonomous vehicle according to real time environmental feedback information from both the LIDAR device 620 and the RADAR device 630. The LIDAR device 620 is scanned through a scanning zone surrounding the vehicle (802). A 3-D point cloud of light-reflective features in the scanning zone is created from the output of the LIDAR device (804). The RADAR device 630 is scanned through the scanning zone surrounding the vehicle (806). A frequency shift of reflected radio signals (e.g., change in frequency between radiation emitted from the RADAR device 630 and corresponding reflected radio signal) is determined (808). The frequency shift ("Doppler shift") evidences relative motion of radio-reflective features in the scanning zone, along a line of sight between the reflective objects and the RADAR device 630. Thus, the output of the RADAR device 630 provides both the relative motion along the RADAR line of sight (indicated by the frequency shift of the reflected radio signals) and the positions of the radio-reflective features (indicated by the time delays of the reflected radio signals).

A current or past position of radio-reflective features that is temporally aligned with the timing of the LIDAR scan is estimated (810). In general, the scan with the LIDAR device 620 (802) and the scan with the RADAR device 630 (806) may not start and/or stop at precisely the same time. As a result, the vehicle (e.g., the vehicle 200 including the system 600), can be displaced spatially between the scan with the LIDAR device 620 and the scan with the RADAR device 630 due to motion of the vehicle. Moreover, environmental objects can themselves be in motion during a temporal offset separating scans with the LIDAR device 620 and the RADAR device 630. Where the temporal offset between the scans is small compared to a timescale for changes in velocity of objects in the scanning zone, the instantaneous velocity of radio-reflective objects (indicated by the frequency shift of the reflected radio signals) is a good estimate of the motion of the objects during the temporal offset between the LIDAR scan and the RADAR scan.

In some embodiments, the temporal offsets between the LIDAR and RADAR scans can be less than an interval between successive scans with the LIDAR and/or RADAR devices. Each LIDAR scan can be associated with the nearest preceding RADAR scan, the nearest following RADAR scan, and/or the RADAR scan that is nearest in time, whether preceding or following. Generally, the extent of the temporal offset between nearest LIDAR and RADAR scans is driven by the slower refresh rate of the two devices. For example, where the refresh rate of the LIDAR device 620 is 10 Hz and the refresh rate of the RADAR device 630 is 15 Hz, the maximum temporal offset is dominated by the 10 Hz refresh rate of the LIDAR device 620. For example, the temporal separation between each LIDAR scan and the next following RADAR scan is less than 100 milliseconds (i.e., 1/10 Hz); the temporal separation between each LIDAR scan and the nearest preceding RADAR scan is less than 100 milliseconds seconds; and the temporal separation between each LIDAR scan and the RADAR scan that is closest in time is less than 50 milliseconds seconds (i.e., half of 1/10 Hz).

In order to account for the temporal offset between the LIDAR and RADAR scans (and the associated spatial displacement of environmental objects during the temporal offset), the radio-reflective features can be projected forward or backward along their direction of motion to estimate their position during the nearest preceding or following LIDAR scan. The direction of motion of the radio-reflected features is indicated by the frequency shift in the reflected radio signals (e.g., due to the Doppler effect). For example, a past position of a radio-reflective object can be estimated by translating the current position of the object (indicated by the time delay of the reflected radio signal) along the line of sight of the RADAR device in a backward direction (i.e., opposite its indicated direction of motion). Similarly, a future position of a radio-reflective object can be estimated by translating the current position of the object along the line of sight of the RADAR device in a forward direction (i.e., along its indicated direction of motion). In particular, the amount of forward or backward translation along the RADAR line of sight can be the product of the Doppler-indicated velocity and the amount of temporal offset between the RADAR scan and the nearest LIDAR scan.

For instance, a radio-reflective object is illuminated by the RADAR device 630 at time $t_0$. The 3-D position of a radio-reflective object is determined to be $(x_1, y_1, z_1)$ based on the time delay of the reflected radio signal. The radio-reflective object is also determined to be in motion with respect to the autonomous vehicle based on the frequency shift of the reflected radio signal. The relative motion along the line of sight of the RADAR device can be given by $(v_x, v_y, v_z)$. The estimated position at time $t_1$ can be given by:

$$(x_2, y_2, z_2) = (x_1, y_1, z_1) + (t_1 - t_0)(v_x, v_y, v_z)$$

It is noted that when $t_1$ is greater than $t_0$, the estimated position at time t1 is displaced from the initial position along the indicated direction of motion given by $(v_x, v_y, v_z)$, whereas when $t_1$ is less than $t_0$, the estimated position at time t1 is displaced from the initial position in the reverse of the direction of motion (e.g., along the direction given by $-(v_x, v_y, v_z)$).

Once the position(s) of the radio-reflective feature(s) are estimated to account for Doppler-indicated motion during temporal offset ("temporal misalignment") between the LIDAR and RADAR scans (810), the estimated positions of the radio-reflective features in the scanning zone can be associated with positions in the 3-D point cloud generated from the LIDAR output (812).

In some embodiments, the angular resolution of the points indicated by radio-reflective features detected in the RADAR scan and the angular resolution of the points indicated by light-reflective features detected by the LIDAR scan can be different. As a result of the difference in angular resolutions, the higher angular resolution one of the LIDAR and RADAR scans can have multiple nearby and/or adjacent points associated with a single point in the lower angular resolution one. For example, the RADAR scan can illuminate radio reflective points in the scanning zone approximately every half of a degree, whereas the LIDAR scanner can pulse its laser approximately every tenth of a degree, such that a two-dimensional scan includes five times as many LIDAR points as RADAR points (and can amount to an even greater in a three-dimensional scan where each point approximately maps out a solid angle.

By associating the motion-corrected estimated positions of the radio-reflective features with positions in the LIDAR-indicated 3-D point map (812), light-reflective features (indicated by LIDAR scan) can be cross-checked for corresponding radio-reflective features at the same location in space and time. The map of solid objects 612 in the scanning zone is generated by including the light-reflective features also represented by corresponding radio-reflective features at the same location (814). The map of solid objects 612 can be created by checking each light-reflective feature (indicated by the LIDAR scan) for the presence of a corresponding radio-reflective feature at the same position (indicated by the RADAR scan). When a radio-reflective feature with comparable size and location is found, the light-reflective feature is included in the map of solid objects 612. When a radio-reflective feature with comparable size and location is not found, the light-reflective feature is not included in the map of solid objects 612. The determination of whether a radio-reflective feature is comparable to a light-reflective feature can be carried out to account for uncertainties in the estimated position and/or differences in angular resolution of the LIDAR and RADAR scans.

The autonomous vehicle is navigated to avoid interference with objects in the map of solid objects 612 (816). In some embodiments, non-solid LIDAR-indicated features, such as water spray patterns and/or exhaust plumes are substantially ignored by the navigation control systems operating the autonomous vehicle. For example, the object avoidance system 144 and/or navigation/pathing system 142 can be provided with the map of solid objects 612 to automatically determine a path for the autonomous vehicle that avoids solid objects without avoiding splashes of water or exhaust plumes even if reflective to visual and/or infrared light. Thus, in some embodiments of the present disclosure, information from both the LIDAR device 620 and the RADAR device 630 are combined to generate the map of solid objects 612.

In some examples, the map of solid objects 612 is a map of reflective features indicated by the LIDAR device 620 that omits any features determined to not include solid materials. The combination of information from the two sensors to create the map of solid objects 612 can be carried out by, for example, the controller 610 implemented as hardware and/or software modules including one or more of the computer system 112, the sensor fusion algorithm 138, the computer visions system 140, etc of the autonomous vehicle 100. The controller can analyze positions of the solid objects in the map of solid objects 630 in relation to a current path of the vehicle 100 to identify obstacles and/or interference with the vehicle 100 indicated by the map of solid objects 100. The controller 610, which can include hardware and/or software implemented modules including the navigation/pathing system 142, the obstacle avoidance system 144, etc. can determine a modified path for the autonomous vehicle 100. For example, the controller 610 can determine a path that minimizes interference with solid objects in the map of solid objects 612, or that maximizes passenger safety during an unavoidable collision/interference with an obstacle by the vehicle 100. The controller 610 can then control the autonomous vehicle 100 to navigate along the modified path. Thus, in some embodiments, the map of solid objects 612 is generated and/or updated repeatedly and used as feedback to inform real time navigation determinations made by an autonomous vehicle operating substantially without human control. As a result, some embodiments of the present disclosure provide for the map of solid objects 612 to be generated and/or updated at a refresh rate that is relevant to real time navigational determinations by an autonomous vehicle.

Some embodiments of the present disclosure are described in connection with an autonomous vehicle that routinely and continuously scans its surrounding environment for both light-reflective objects (e.g., via the LIDAR device 620) and radio-reflective objects (e.g., via the RADAR device 630). However, the present disclosure can be carried out by selectively scanning regions of a scanning zone with a RADAR device to detect radio-reflectivity of light-reflective features in the LIDAR-indicated 3-D point map. Moreover, some embodiments provide for only scanning the RADAR device to check for radio-reflectivity (or only analyzing substantially continuously scanned radio-reflectivity data from the RADAR device) if the light-reflective features exhibit particular criteria. For example, where a grouping of points in the 3-D point cloud are distributed in a manner resembling reflected points in an aerosol cloud of water droplets, the output from the RADAR device 630 can be checked for evidence of a corresponding radio-reflective feature at the same position. Thus, a grouping of LIDAR-indicated points in the 3-D point cloud that satisfies pre-set and/or dynamically configured criteria can trigger a check to determine whether a radio-reflective object is present in the same location.

The criteria for triggering a check of the RADAR data can be a discontinuity of a surface defined by the grouping of points. Whereas most environmental features scanned by the LIDAR device 620 can be grouped together along a roughly continuous surface (such as a surface of a tree, building, car, etc.), a distribution of atomized water droplets (or other particulates) lack a smooth, continuous boundary as some light pulses can be reflected from a water droplet near the center of the cloud, even while angularly adjacent light pulses can be reflected from water droplets near the outer edges of the cloud, and others pass entirely through the cloud and provide no reflected return signal. The resulting distribution of points in the 3-D point map for such a distribution of atomized water droplets (or other particulates) can be a group that lacks a smooth bounding surface, which can be quantified by a standard deviation of points distributed away from a nominal surface defined by the group of points exceeding a threshold value, for example. Thus some embodiments provide for only initiating a RADAR scan of a particular region (or analyzing RADAR data from the region) when the region includes a group of LIDAR-indicated points with a spatially discontinuous distribution indicative of reflection from a dispersed aerosol.

Additionally or alternatively, the criteria for triggering a check of the RADAR data can include a height above the ground of a group of points, such as a height typically associated with a plume of exhaust gases and/or water spray. Other criteria can be associated with point map distributions indicating water spray and/or exhaust plumes. In some embodiments, a water spray pattern can be associated with a lobe shape trailing behind wheels/tires of a perceived vehicle. In some embodiments, a generally vertical point density gradient can be associated with an exhaust plume, because exhaust gases generally disperse as the plume rises, which causes the group of light-reflective points in the plume to decrease in spatial density at greater distances from the ground.

Moreover, some embodiments of the present disclosure provide for determining whether a LIDAR-indicated group of points includes a solid material (and thus corresponds to a solid object to be included in the map of solid objects 612) based on a combination of the distribution of points in the 3-D point map and the presence (or absence) of a radio-reflective feature in the location of the group of points. For example, the likelihood of the presence of a solid object at a location on the 3-D point map including a group of points can be determined according to a function including the signal strength of one or more corresponding returning reflected radio signals and the standard deviation of the positions of the points with respect to a nominal surface characterizing the group.

FIGS. 7 and 8 are provided for exemplary purposes only to illustrate the function of distinguishing solid objects from non-solid objects according to radio-reflective characteristics indicated by a RADAR device. Some embodiments of the present disclosure include utilizing the ability to distinguish solid materials from non-solid materials to make real time navigation decisions for an autonomous vehicle. Such an autonomous vehicle can thereby operate to avoid collisions and/or interference with solid objects, such as indicated by the LIDAR device 620, the computer vision system 140, etc., while safely ignoring reflective features that do not require comparable navigational adjustments, such as water spray patterns, exhaust plumes, dust clouds, fog, etc.

FIGS. 7 and 8 present flowcharts describing processes employed separately or in combination in some embodiments of the present disclosure. The methods and processes described herein are generally described by way of example as being carried out by an autonomous vehicle, such as the autonomous vehicles 100, 200 described above in connection with FIGS. 1 and 2. For example, the processes described herein can be carried out by the LIDAR sensor 128 and the RADAR sensor 126 mounted to an autonomous vehicle in communication with the computer system 112, sensor fusion algorithm module 138, and/or computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowcharts. Where used, program code can be stored on any type of computer readable medium (e.g., computer readable storage medium or non-transitory media, such as data storage 114 described above with respect to computer system 112), for example, such as a storage device including a disk or hard drive. In addition, each block of the flowcharts can represent circuitry that is wired to perform the specific logical functions in the process. Unless specifically indicated, functions in the flowcharts can be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure.

As used herein a "scanning zone" generally refers to a region of a scanned environment scanned by a single LIDAR device, or a combination of LIDAR devices, that is completely sampled in a complete scan by the LIDAR device. That is, for a LIDAR device operated to continuously actively map its surroundings for reflective features, the scanning zone is the complete region mapped before returning to map the same point again. Generally, the scanning zone referred to herein is defined with reference to the point of view of the LIDAR device in terms of azimuth (e.g., angle along the horizon) and altitude (e.g., angle perpendicular to the horizon) with respect to the point of view of the LIDAR device. Thus, the geographic location mapped by the scanning zone of a LIDAR device is not fixed, but rather moves with the LIDAR device. For example, the scanning zone can be considered a bubble surrounding a particular LIDAR device with dimensions defined by the maximum distance sensitivity of the LIDAR device.

Figure 9:
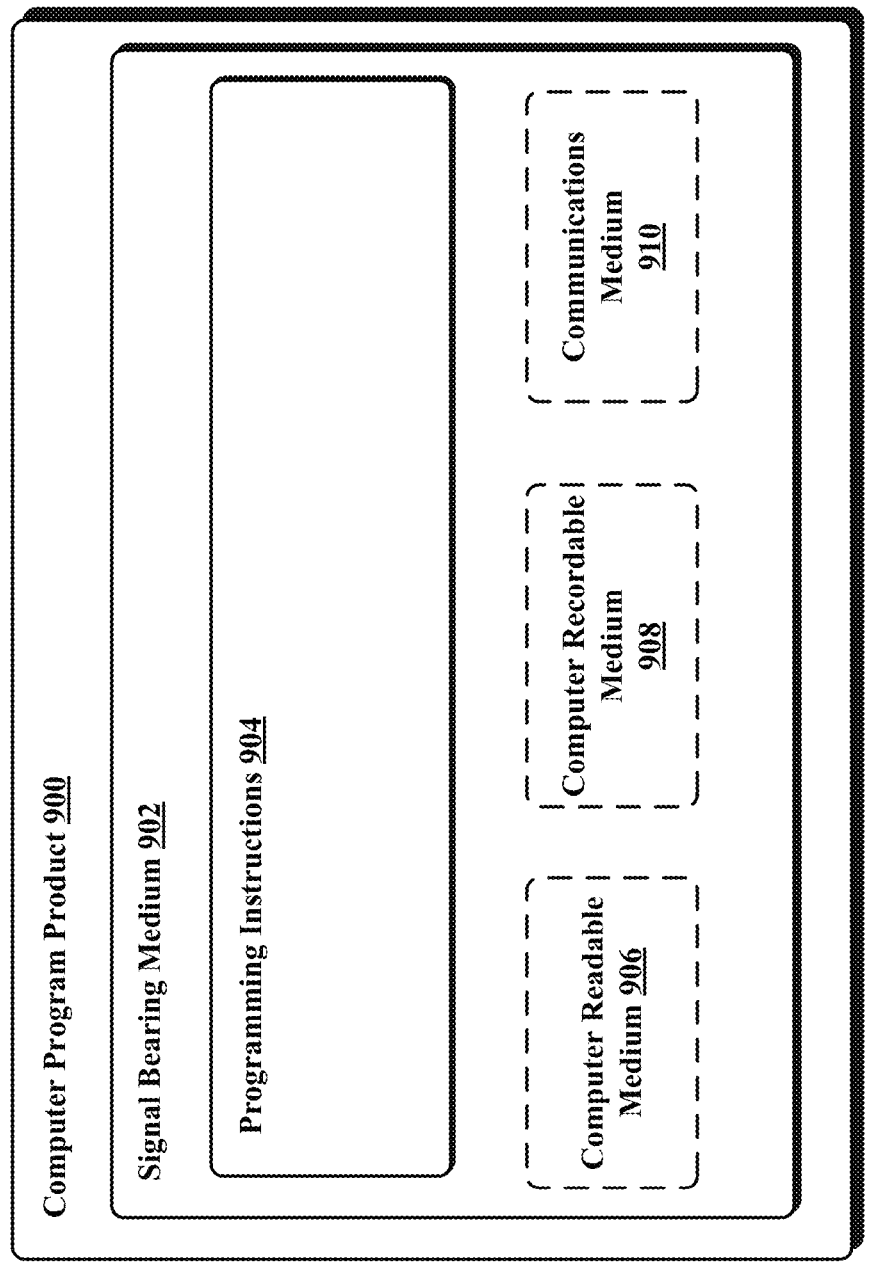
FIG. 9 depicts a non-transitory computer-readable medium configured according to an example embodiment.

FIG. 9 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above, such as the processes discussed in connection with FIGS. 7-8 above.

As noted above, in some embodiments, the disclosed techniques can be implemented by computer program instructions encoded on a non-transitory computer-readable storage media in a machine-readable format, or on other non-transitory media or articles of manufacture (e.g., the instructions 115 stored on the data storage 114 of the computer system 112 of vehicle 100). FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-8. In some examples, the signal bearing medium 902 can be a computer-readable medium 906, such as, but not limited to, a hard disk drive, a Compact Disc (CD), a Digital Versatile Disk (DVD), a digital tape, memory, etc. In some implementations, the signal bearing medium 902 can be a computer recordable medium 908, such as, but not limited to, memory, read/write (R/W) CDs, R/W DVDs, etc. In some implementations, the signal bearing medium 902 can be a communications medium 910, such as, but not limited to, a digital and/or an analog communication medium (e.g., a fiber optic cable, a waveguide, a wired communications link, a wireless communication link, etc.). Thus, for example, the signal bearing medium 902 can be conveyed by a wireless form of the communications medium 910.

The one or more programming instructions 904 can be, for example, computer executable and/or logic implemented instructions. In some examples, a computing device such as the computer system 112 of FIG. 1 is configured to provide various operations, functions, or actions in response to the programming instructions 904 conveyed to the computer system 112 by one or more of the computer readable medium 906, the computer recordable medium 908, and/or the communications medium 910.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:
    scanning a light detection and ranging (LIDAR) device associated with an autonomous vehicle through a scanning zone while emitting light pulses;
    determining a three-dimensional (3-D) point map of the scanning zone based on time delays between emitting the light pulses and receiving corresponding returning reflected signals and based on orientations of the LIDAR device while emitting the light pulses;
    scanning, with a radio detection and ranging (RADAR) device associated with the autonomous vehicle, one or more regions of the scanning zone corresponding to one or more light-reflective features indicated by the 3-D point map, to identify one or more radio-reflective features;
    determining a temporal offset between the scanning with the LIDAR device and the scanning with the RADAR device;
    associating the one or more radio-reflective features with respective positions in the 3-D point map so as to account for a spatial displacement of the one or more radio-reflective features with respect to the 3-D point map during the temporal offset;
    determining whether the one or more light-reflective features include a solid material by, for each of the one or more light-reflective features:
        responsive to determining that the light-reflective feature is at a position in the 3-D point map that is associated with the radio-reflective feature, determining that the light-reflective feature includes a solid material; and
        responsive to determining that the light-reflective feature is at a position in the 3-D point map that is not associated with the radio-reflective feature, determining that the light-reflective feature does not include a solid material; and
    controlling the autonomous vehicle to avoid light-reflective features determined to include a solid material.

2. The method according to claim 1, further comprising:
    determining a frequency shift of one or more reflected radio signals indicating a relative motion of the one or more radio-reflective features along a line of sight of the RADAR device; and
    estimating a position of the one or more radio-reflective features during the scanning with the LIDAR device by projecting the one or more radio-reflective features along the line of sight of the RADAR device according to the indicated relative motion and the temporal offset between the scanning with the LIDAR device and the scanning with the RADAR device.

3. The method according to claim 2, wherein the scanning with the RADAR device precedes the scanning with the LIDAR device such that the estimated position of the one or more radio-reflective features is projected along the line of sight of the RADAR device in a direction of the indicated relative motion of the one or more radio-reflective features.

4. The method according to claim 2, wherein the scanning with the LIDAR device precedes the scanning with the RADAR device such that the estimated position of the one or more radio-reflective features is projected along the line of sight of the RADAR device in an opposite direction of the indicated relative motion of the one or more radio-reflective features.

5. The method according to claim 1, further comprising:
    scanning the scanning zone with the RADAR device; and
    associating one or more radio-reflective features indicated by reflected radio signals with estimated positions during the scanning with the LIDAR based on time delays and frequency shifts of the reflected radio signals, wherein the scanning with the LIDAR device is temporally offset from the scanning with the RADAR device.

6. The method according to claim 1, further comprising:
    combining information from the LIDAR device and the RADAR device to generate a map of solid objects in the scanning zone, wherein light-reflective features indicated by the 3-D point map determined to not include a solid material are not included in the map of solid objects.

7. The method according to claim 6, further comprising:
    analyzing the positions of the solid objects in the map of solid objects to identify obstacles relative to a current path of the autonomous vehicle;
    determining a modified path of the autonomous vehicle that avoids the identified obstacles; and
    controlling the autonomous vehicle to navigate along the modified path.

8. The method according to claim 1, further comprising:
    identifying the region of the scanning zone for scanning with the RADAR device responsive to associating a group of points included in the light-reflective feature with a spatially discontinuous distribution indicative of reflection from a dispersed aerosol.

9. The method according to claim 1, further comprising:
    identifying the region of the scanning zone for scanning with the RADAR device responsive to associating a group of points included in the light-reflective feature with splashing water or an exhaust plume.

10. An autonomous vehicle system comprising:
    a light detection and ranging (LIDAR) device including:
        a light source configured to be scanned through a scanning zone while emitting light pulses; and
        a light detector configured to receive returning reflected signals from light-reflective features in the scanning zone, if any;
    a radio detection and ranging (RADAR) device including:
        an illuminating radio antenna configured to be scanned through the scanning zone; and
        a radio receiver configured to detect reflected radio signals from radio-reflective features in the scanning zone, if any; and
    a controller configured to:
        instruct the LIDAR device to scan the scanning zone while emitting light pulses;
        receive information from the LIDAR device indicative of the time delays between emission of the light pulses and reception of the corresponding returning reflected signals;
        determine, based on the time delays and orientations of the LIDAR device while emitting the light pulses, a three dimensional (3-D) point map;
        instruct the RADAR device to scan one or more regions of the scanning zone corresponding to one or more light-reflective features indicated by the 3-D point map, to identify one or more radio reflective features;
        determining a temporal offset between the scanning with the LIDAR device and the scanning with the RADAR device;
        associating the one or more radio-reflective features with respective positions in the 3-D point map so as to account for a spatial displacement of the one or more radio-reflective features with respect to the 3-D point map during the temporal offset;

determine whether the one or more light-reflective features include a solid material by, for each of the one or more light-reflective features:

responsive to determining that the light-reflective feature is at a position in the 3-D point map that is associated with the radio-reflective feature, determine that the light-reflective feature includes a solid material; and responsive to determining that the light-reflective feature is at a position in the 3-D point map that is not associated with the radio-reflective feature, determine that the light-reflective feature does not include a solid material; and control the autonomous vehicle to avoid light-reflective features determined to include a solid material.

11. The autonomous vehicle system according to claim 10, wherein the controller is further configured to:

determine a frequency shift of one or more reflected radio signals indicating a relative motion of the one or more radio-reflective features along a line of sight of the RADAR device; and estimate a position of the one or more radio-reflective features during the scan with the LIDAR device by projecting the one or more radio-reflective features along the line of sight of the RADAR device according to the indicated relative motion and the temporal offset between the scan with the LIDAR device and the scan with the RADAR device.

12. The autonomous vehicle system according to claim 10, wherein the controller is further configured to:

instruct the RADAR device to scan the scanning zone; and associate one or more radio-reflective features indicated by reflected radio signals with estimated positions during the scan with the LIDAR based on time delays and frequency shifts of the reflected radio signals, wherein the scan with the LIDAR device is temporally offset from the scan with the RADAR device.

13. The autonomous vehicle system according to claim 10, wherein the controller is further configured to:

combine information from the LIDAR device and the RADAR device to generate a map of solid objects in the scanning zone, wherein light-reflective features indicated by the 3-D point map determined to not include a solid material are not included in the map of solid objects.

14. The autonomous vehicle system according to claim 13, wherein the controller is further configured to:

analyze the positions of the solid objects in the map of solid objects to identify obstacles relative to a current path of the autonomous vehicle;

determine a modified path of the autonomous vehicle that avoids the identified obstacles; and control the autonomous vehicle to navigate along the modified path.

15. The autonomous vehicle system according to claim 10, wherein the controller is further configured to:

identify the region of the scanning zone for scanning with the RADAR device responsive to associating a group of points included in the light-reflective feature with a spatially discontinuous distribution indicative of reflection from a dispersed aerosol.

16. A non-transitory computer readable medium storing instructions that, when executed by one or more processors in a computing device, cause the computing device to perform operations, the operations comprising:

scanning a light detection and ranging (LIDAR) device associated with an autonomous vehicle through a scanning zone while emitting light pulses;

determining a three-dimensional (3-D) point map of the scanning zone based on time delays between emitting the light pulses and receiving corresponding returning reflected signals and based on orientations of the LIDAR device while emitting the light pulses;

scanning, with a radio detection and ranging (RADAR) device associated with the autonomous vehicle, one or more regions of the scanning zone corresponding to one or more light-reflective features indicated by the 3-D point map, to identify one or more radio-reflective features;

determining a temporal offset between the scanning with the LIDAR device and the scanning with the RADAR device;

associating the one or more radio-reflective features with respective positions in the 3-D point map so as to account for a spatial displacement of the one or more radio-reflective features with respect to the 3-D point map during the temporal offset;

determining whether the one or more light-reflective features include a solid material by, for each of the one or more light-reflective features:

responsive to determining that the light-reflective feature is at a position in the 3-D point map that is associated with the radio-reflective feature, determining that the light-reflective feature includes a solid material; and responsive to determining that the light-reflective feature is at a position in the 3-D point map that is not associated with the radio-reflective feature, determining that the light-reflective feature does not include a solid material; and controlling the autonomous vehicle to avoid light-reflective features determined to include a solid material.

17. The non-transitory computer readable medium according to claim 16, wherein associating the one or more radio-reflective features with respective positions in the 3-D point map is further based on a frequency shift associated with a reflected radio signal indicating the radio-reflective feature.

18. The non-transitory computer readable medium according to claim 16, wherein the operations further comprise:

combining information from the LIDAR device and the RADAR device to generate a map of solid objects in the scanning zone, wherein light-reflective features indicated by the 3-D point map determined to not include a solid material are not included in the map of solid objects;

analyzing the positions of the solid objects in the map of solid objects to identify obstacles relative to a current path of the autonomous vehicle;

determining a modified path of the autonomous vehicle that avoids the identified obstacles; and controlling the autonomous vehicle to navigate along the modified path.

* * * * *